United States Patent
Kotra et al.

(10) Patent No.: US 12,511,236 B2
(45) Date of Patent: Dec. 30, 2025

(54) STORING INDICATIONS OF CLEARED CACHE LINES

(71) Applicant: Advanced Micro Devices, Inc., Santa Clara, CA (US)

(72) Inventors: Jagadish B. Kotra, Austin, TX (US); John Kalamatianos, Arlington, MA (US); David A. Kaplan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/618,575

(22) Filed: Mar. 27, 2024

(65) Prior Publication Data

US 2025/0307145 A1 Oct. 2, 2025

(51) Int. Cl.
*G06F 12/0811* (2016.01)
*G06F 12/0891* (2016.01)

(52) U.S. Cl.
CPC ...... *G06F 12/0811* (2013.01); *G06F 12/0891* (2013.01)

(58) Field of Classification Search
None
See application file for complete search history.

(56) References Cited

U.S. PATENT DOCUMENTS

| | | | | |
|---|---|---|---|---|
| 6,009,504 | A * | 12/1999 | Krick | G06F 12/0893 711/108 |
| 2011/0119451 | A1* | 5/2011 | Fuller | G06F 12/0802 711/E12.001 |
| 2012/0159077 | A1* | 6/2012 | Steely, Jr. | G06F 12/0804 711/E12.044 |
| 2014/0173210 | A1* | 6/2014 | O'Connor | G06F 12/0815 711/128 |
| 2014/0258635 | A1* | 9/2014 | Hong | G06F 12/0808 711/133 |
| 2016/0217080 | A1* | 7/2016 | Solihin | G06F 12/0837 |
| 2021/0191865 | A1* | 6/2021 | Kalyanasundharam | G06F 12/0817 |
| 2024/0053897 | A1* | 2/2024 | Abali | G06F 3/0652 |

OTHER PUBLICATIONS

Blackburn, Stephen, et al., "Myths and realities: the performance impact of garbage collection", ACM Sigmetrics Performance Evaluation Review, vol. 32, No. 1 [retrieved May 10, 2023]. Retrieved from the Internet <https://www.cs.utexas.edu/users/mckinley/papers/mmtk-sigmetrics-2004.pdf>., Jun. 1, 2004, 12 Pages.

Gouk, Donghyun, et al., "Memory Pooling With CXL", IEEE Micro, vol. 43, No. 2, Mar. 2023, 10 pages.

(Continued)

*Primary Examiner* — Kaushikkumar M Patel
(74) *Attorney, Agent, or Firm* — FIG. 1 Patents

(57) ABSTRACT

Storing indications of cleared cache lines is described. In one example, a cache system includes a plurality of cache levels and a cleared page tag structure coupled to a level of the plurality of cache levels that detects a cache line within the plurality of cache levels that is cleared of data. The cleared page tag structure then stores a tag in the cleared page tag structure indicating that the cache line within the plurality of cache levels is cleared of data.

20 Claims, 6 Drawing Sheets

(56) References Cited

OTHER PUBLICATIONS

Grcevski, Nikola, et al., "Java™ Just-In-Time Compiler and Virtual Machine Improvements for Server and Middleware Applications", VM'04: Proceedings of the 3rd conference on Virtual Machine Research And Technology Symposium, vol. 3 [retrieved Dec. 19, 2023]. Retrieved from the Internet <https://www.usenix.org/legacy/events/vm04/tech/full_papers/grcevski/grcevski.pdf>, May 2004, 13 pages.

Ha, Minho, et al., "Dynamic Capacity Service for Improving CXL Pooled Memory Efficiency", IEEE Micro, vol. 43, No. 2 [retrieved Mar. 9, 2023]. Retrieved from the Internet <https://doi.org/10.1109/MM.2023.3237756>, Mar. 2023, 9 pages.

IBM, "The PowerPC Architecture: A Specification for a New Family of Risc Processors", International Business Machines, Inc., Morgan Kaufmann Publishers, Inc., San Francisco, California>1 of 5, 1994, 554 pages.

Intel, "Intel® 64 and IA-32 Architectures Optimization Reference Manual", Intel Corporation [retrieved Dec. 31, 2023]. Retrieved from the Internet <https://cdrdv2.intel.com/v1/dl/getContent/671488?fileName=248966-Software-Optimization-Manual-R047.pdf>10 of 12, May 2023, 1041 pages.

Jiang, Xiaowei, et al., "Architecture Support for Improving Bulk Memory Copying and Initialization Performance", 2009 18th International Conference on Parallel Architectures and Compilation Techniques [retrieved Nov. 17, 2023]. Retrieved from the Internet <, Sep. 2009, 12 pages.

Jouppi, "Cache Write Policies and Performance", Western Research Laboratory, ISCA 1993, Dec. 1991, 48 pages.

Kessler, Peter B, "FOSDEM 2007 Java HotSpot™ Virtual Machine", Sun Microsystems, Inc. [retrieved Dec. 19, 2023]. Retrieved from the Internet <https://openjdk.org/groups/hotspot/docs/FOSDEM-2007-HotSpot.pdf>, Feb. 2007, 9 pages.

Novark, et al., "Exterminator: Automatically Correcting Memory Errors with High Probability", PLDI, 2007, 12 pages.

Seshadri, Vivek, et al., "RowClone: fast and energy-efficient in-DRAM bulk data copy and initialization", MICRO-46: Proceedings of the 46th Annual IEEE/ACM International Symposium on Microarchitecture [retrieved Nov. 17, 2023]. Retrieved from the Internet <https://doi.org/10.1145/2540708.2540725>, Dec. 2013, 13 pages.

Unknown, "ARM Cortex-A Series Programmer's Guide for ARMv8-A", arm Developer [retrieved Dec. 31, 2023]. Retrieved from the Internet <https://developer.arm.com/documentation/den0024/a/Memory-Ordering/Barriers/Non-temporal-load-and-store-pair>, 3 pages.

Yang, "Why Nothing Matters: The Impact of Zeroing", OOPSLA 2011, Aug. 22, 2011, 18 pages.

Zhao, Li, et al., "Hardware support for bulk data movement in server platforms", 2005Computer Design [retrieved Nov. 17, 2023]. Retrieved from the Internet <https://doi.org/10.1109/ICCD.2005.64>, Oct. 2005, 8 pages.

* cited by examiner

STORING INDICATIONS OF CLEARED CACHE LINES

BACKGROUND

Data caches are small, high-speed storage locations used in computer systems to temporarily hold frequently accessed or recently used data, such as for a central processing unit (CPU). The purpose of a cache is to improve the overall performance and speed of the computer by reducing the time it takes to access data from main memory or hard drives. Caches often operate using a hierarchy, where data is first checked in a Level 1 cache, then a Level 2 cache, and finally, a Level 3 cache or main memory if data is not found in the preceding caches. Such a hierarchy ensures that frequently accessed data is readily available to the CPU, minimizing the time spent waiting for data to be fetched from slower memory or storage. The management of data in these caches is handled by hardware and caching algorithms to ensure that the most relevant data is retained while less frequently used data is replaced. Caches are a fundamental component of modern computer architecture, contributing significantly to the speed and efficiency of computing systems.

DETAILED DESCRIPTION

Figure 1:
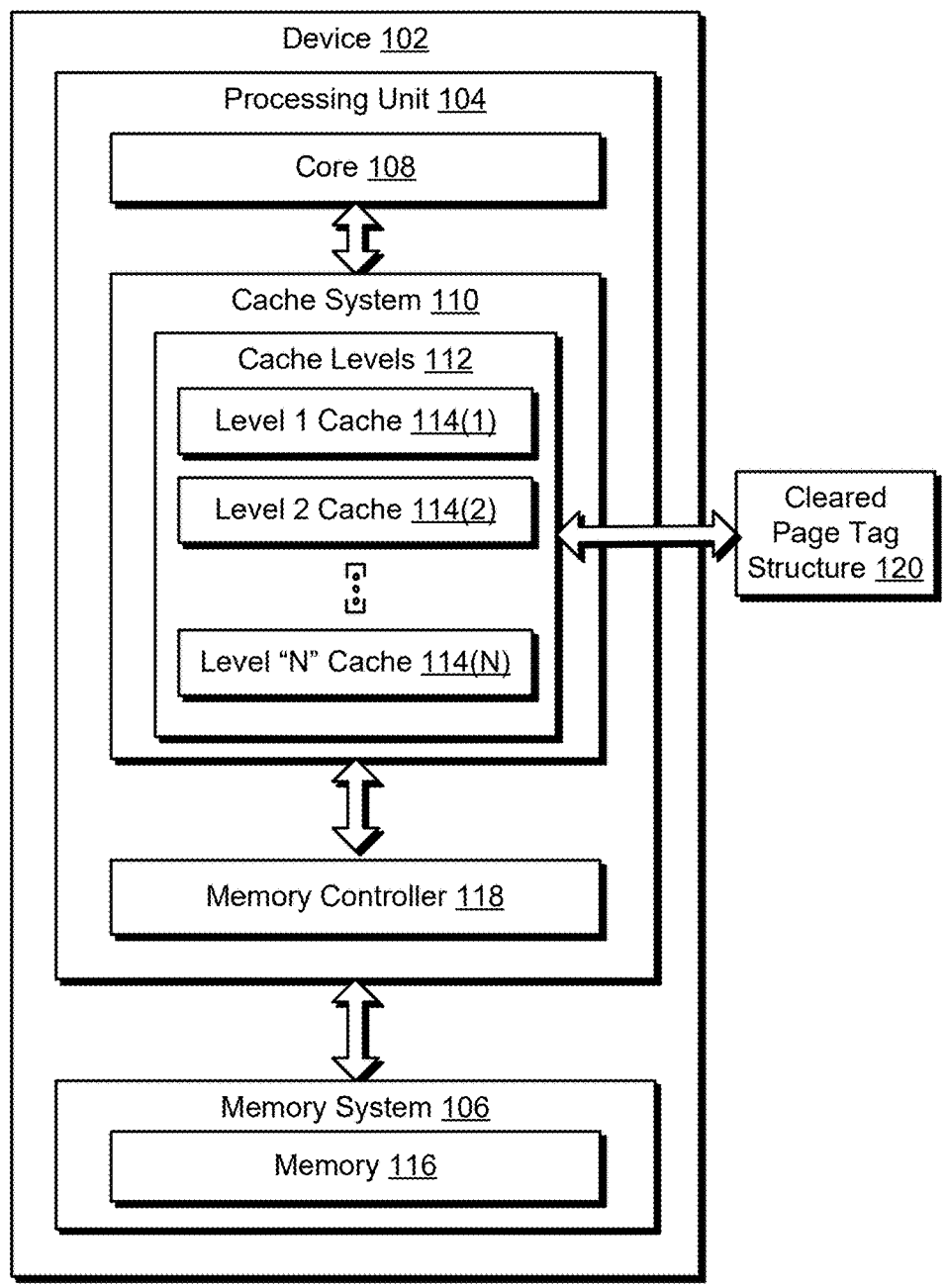
FIG. 1 is a block diagram of a non-limiting example system having a device that implements a processing unit and memory system to store indications of cleared cache lines.

With advances in computing device technology, processing devices are manufactured with an increasing number of processing units (e.g., with an increasing number of cores). Because cores initiate requests to fetch target data from other parts the processing device, an increase in core count results in an increase in data fetch requests. For example, in a device implementing a multi-level cache system, a data fetch request initiates a search of cache lines of the Level 1 cache for the target data. Cache lines are portions of data stored in a cache. If the target data is absent from the Level 1 cache, the search moves on to a Level 2 cache, and so on down through lower levels of a hierarchy of cache levels to the system memory. These repeated searches result in increased bandwidth usage and slower computing times.

Memory allocation operations also contribute to this bandwidth usage. As part of a computational task, or via an explicit operation performed for the computational task, an instruction is executed by a core of a processor to clear the data of one or more cache lines (e.g., an entire cache page) by writing a zero to every byte in the one or more cache lines. In many implementations, system software "zeroes-out" data for safety, including to avoid leaking data written to a cache by a previous process that had ownership of the data page.

Conventional systems implement CLZero, or similar zeroing instructions, to indicate that a cache line is cleared of data by zeroing out the cache line. However, this consumes bandwidth by physically writing zeroes to hardware (e.g., via a communication channel coupling a processor and memory or a cache system), which consumes energy. Because CLZero does not communicate which pages include only zeroes to the core of the processing unit, a subsequent data request originating from the core to read data from a known zeroed-out cache line incurs round trip traffic that results from transmitting a request for data to a cache line that is cleared.

To overcome these conventional shortcomings, techniques for storing indications of cleared cache lines are described. The techniques involve indicating that a line in memory or a cache line is cleared and causing a data request to be redirected away from the memory or the cache to conserve bandwidth. To enable the described techniques, a cache system implements a cleared page tag structure. In at least one implementation, the cleared page tag structure is implemented using a static random-access memory (SRAM) cache structure. The cleared page tag structure tracks data address regions (e.g., cache lines, pages) that have been cleared (e.g., zeroed-out by writing zeroes to all bytes in the region) by the system (e.g., by executing one or more operations as part of performing a computational task, at memory allocation, etc.).

In one or more implementations, the cleared page tag structure monitors physical addresses at a page granularity. For example, the cleared page tag structure intercepts requests to clear a memory region, such as a cache line, and maintains a record of cleared cache lines. For instance, the cleared page tag structure generates an indication that a cache line has been cleared of data by assigning a bit value to a page tag corresponding to the cleared cache line in the cleared page tag structure. Each cleared page tag structure entry contains a vector (e.g., a 64-bit vector), where each bit corresponds to a cache line. In one or more implementations, a cleared page tag structure entry with a bit set to zero indicates that the cache line has not yet been cleared. When a request to clear the cache line is received, the corresponding bit for the cache line is set to one. In different examples, the cleared page tag structure is located in or attached to different components of the system, such as in a core complex die (CCD), in data fabric that connects various hardware components of the system, and so on.

Subsequent data fetch traffic corresponding to a data request first searches the cleared page tag structure for the target data. For instance, data requests other than zero-out requests (e.g., requests to read data stored in memory or requests to write data to memory) trigger a lookup in the cleared page tag structure. In the continuing scenario, when a bit corresponding to a cache line that is specified in the data request has a value set to a value of one in the cleared page tag structure, the bit indicates that the requested cache line (e.g., the requested data stored at the cache line) has been cleared. In short, the bit indicates that the data to be returned is only zeroes. Thus, a cache line with only zeroes is returned to the requesting entity (e.g., a processor core) after the data fetch traffic encounters the indication that the cache line has been cleared of data. Notably, this occurs without forwarding the request to a next level in the cache system or to main memory. Further, this avoids round-trip traffic that would otherwise occur with conventional systems where a data request for zeroed-out data is communicated through an entire cache hierarchy, to main memory, and/or a combination thereof. In this manner, the cleared page tag structure eliminates, in response to a hit for a cache line, unnecessary data fetch traffic to further cache levels and/or to the main memory.

By eliminating further data fetch traffic for cache lines that are known to include only zeroes, the systems and techniques described herein reduce overall data traffic for the system, thus improving performance of the system and reducing energy that would otherwise be consumed by the system using conventional techniques. This is particularly advantageous in multi-level cache systems because data fetch traffic can be processed without searching cache levels down the hierarchy, resulting in reduced bandwidth consumption, which is not possible using conventional systems.

In some aspects, the techniques described herein relate to a cache system including: a plurality of cache levels; and a cleared page tag structure coupled to a level of the plurality of cache levels to: detect that a cache line within the plurality of cache levels is cleared of data; and store a tag indicating that the cache line within the plurality of cache levels is cleared of data.

In some aspects, the techniques described herein relate to a cache system, wherein the cleared page tag structure is further configured to: detect that an additional cache line within the plurality of cache levels is cleared of data; and store an additional tag concurrently with the tag, the additional tag indicating that the additional cache line within the plurality of cache levels is cleared of data.

In some aspects, the techniques described herein relate to a cache system, wherein the cleared page tag structure is located at a particular level of the plurality of cache levels and is configured to update a corresponding cache line of a lower level of the plurality of cache levels with a value of zero in response to detecting that a cache line within the particular level of the plurality of cache levels is cleared of data.

In some aspects, the techniques described herein relate to a cache system, wherein the particular level of the plurality of cache levels is a Level 2 cache and the lower level of the plurality of cache levels is a Level 3 cache.

In some aspects, the techniques described herein relate to a cache system, wherein the cleared page tag structure is a static random-access memory (SRAM) cache structure that is coupled to a level of the plurality of cache levels.

In some aspects, the techniques described herein relate to a cache system, wherein the cleared page tag structure is configured to track requests from a core to clear cache lines.

In some aspects, the techniques described herein relate to a cache system, wherein the cleared page tag structure stores a bit value of one in the tag to indicate that the cache line is cleared of data.

In some aspects, the techniques described herein relate to a cache system, wherein data fetch traffic returns bit values of zero to a core of a processing unit in response to a request issued by the core to retrieve data from the cache line based on the tag indicating that the cache line is cleared of data.

In some aspects, the techniques described herein relate to a cache system, wherein the cleared page tag structure reverses a value stored in the tag in response to the request issued by the core to retrieve the data from the cache line.

In some aspects, the techniques described herein relate to a cache system, wherein the cache line that is cleared of data includes only values of zero.

In some aspects, the techniques described herein relate to a cache system, wherein the cleared page tag structure updates the tag based on modification of data within the plurality of cache levels.

In some aspects, the techniques described herein relate to a device including: a cleared page tag structure configured to: receive an indication that a data fetch request from a core of a processing unit to be subsequently executed as part of performing a computational task involves a cache line in a plurality of cache levels; and send, to the core, an indication that the cache line is cleared of data based on a lookup in the cleared page tag structure for a tag corresponding to the cache line.

In some aspects, the techniques described herein relate to a device, wherein the cleared page tag structure is configured to track requests from cores to clear cache lines.

In some aspects, the techniques described herein relate to a device, wherein the cleared page tag structure is located at a particular level of the plurality of cache levels and is configured to update a corresponding cache line of a lower level of the plurality of cache levels with a value of zero in response to detecting that a cache line within the particular level of the plurality of cache levels is cleared of data.

In some aspects, the techniques described herein relate to a device, wherein the particular level of the plurality of cache levels is a Level 2 cache and the lower level of the plurality of cache levels is a Level 3 cache.

In some aspects, the techniques described herein relate to a device, wherein the cleared page tag structure is located at a system probe filter coupled to the plurality of cache levels.

In some aspects, the techniques described herein relate to a device, wherein the cleared page tag structure is a static random-access memory (SRAM) cache structure that is coupled to a level of the plurality of cache levels.

In some aspects, the techniques described herein relate to a device, wherein the cleared page tag structure stores a bit value of one in a tag to indicate that the cache line is cleared of data.

In some aspects, the techniques described herein relate to a method including: detecting that a cache line within a plurality of cache levels is cleared of data based on a computational task performed as part of a plurality of commands executed by a core of a processing unit; and storing a tag in a cleared page tag structure indicating that the cache line within the plurality of cache levels is cleared of data.

In some aspects, the techniques described herein relate to a method, further including: detecting that an additional cache line within the plurality of cache levels is cleared of data; and storing an additional tag in the cleared page tag structure concurrently with the tag, the additional tag indicating that the additional cache line within the plurality of cache levels is cleared of data.

FIG. 1 is a block diagram of a non-limiting example system 100 having a device that implements a processing unit and memory system to store indications of cleared cache lines in accordance with the techniques described herein. The device 102 includes a processing unit 104 and a memory system 106 communicatively coupled via a bus structure.

The techniques described herein are usable by a wide range of device configurations. Such device configurations include, by way of example and not limitation, computing devices, servers, mobile devices (e.g., wearables, mobile phones, tablets, laptops), processors (e.g., graphics processing units, central processing units, and accelerators), digital signal processors, machine learning inference accelerators, disk array controllers, hard disk drive host adapters, memory cards, solid-state drives, wireless communications hardware connections, Ethernet hardware connections, switches, bridges, network interface controllers, and other apparatus configurations. Additional examples include artificial intelligence training and inference accelerators, cryptography and compression accelerators, network packet processors, and video coders and decoders.

The processing unit 104 includes at least one core 108. The core 108 is an electronic circuit (e.g., implemented as an integrated circuit) that performs various operations on and/or using data in the memory system 106. Examples of processing unit 104 and core 108 configurations include, but are not limited to, a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), examples of which include to add, to move data, and to branch. Although one core is depicted in the illustrated example, in variations, the device 102 includes more than one core (e.g., the device 102 is a multi-core processor). In at least one implementation, the device 102 and/or the processing unit 104 is or is part of a system on chip (SoC).

The processing unit 104 includes a cache system 110 having a plurality of cache levels 112, examples of which are illustrated as a level 1 cache 114(1) through a level "N" cache 114(N). The cache system 110 is configured in hardware (e.g., as an integrated circuit) communicatively disposed between the processing unit 104 and the memory 116 of the memory system 106. The cache system 110 is configurable as integral with the core 108, as part of the processing unit 104, as a dedicated hardware device as part of the processing unit 104, and so forth. The cache system 110 stores and manages frequently accessed or recently used data, improving data retrieval performance and reducing latency. For example, the plurality of cache levels 112 include pages of data, and configuration of the cache levels 112 as hardware is utilized to take advantage of a variety of locality factors. Spatial locality is used to improve operation in situations in which data is requested that is stored physically close to data that is a subject of a previous request. Temporal locality is used to address scenarios in which data that has already been requested is anticipated to be requested again.

In cache operations, a "hit" occurs to a cache level when data that is subject of a load operation is available via the cache level, and a "miss" occurs when the desired data is not available via the cache level. When employing multiple cache levels, requests are processed through successive cache levels until the data is located. The cache system 110 is configurable in a variety of ways (e.g., in hardware) to address a variety of processing unit 104 configurations, such as a central processing unit cache, graphics processing unit cache, parallel processing unit cache, digital signal processor cache, and so forth.

In one or more implementations, the memory system 106 is a circuit board (e.g., a printed circuit board), on which the memory 116 (e.g., physical memory such as dynamic random-access memory) is mounted and includes a processing-in-memory component (e.g., implemented in hardware using one or more integrated circuits). In some variations, one or more integrated circuits of the memory 116 are mounted on the circuit board of the memory system 106. Examples of the memory system 106 include, but are not limited to, a TransFlash memory module, a single in-line memory module (SIMM), a dual in-line memory module (DIMM), and various non-volatile memories. In one or more implementations, the memory system 106 is a single integrated circuit device that incorporates the memory 116.

The memory 116 is a device or system that is used to store data, such as for immediate use in a device (e.g., by the core 108). In one or more implementations, the memory 116 corresponds to semiconductor memory where data is stored within memory cells on one or more integrated circuits. In at least one example, the memory 116 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 116 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM).

The memory controller 118 is a digital circuit (e.g., implemented in hardware) that manages the flow of data to and from the memory 116 of the memory system 106. By way of example, the memory controller 118 includes logic to read and write to the memory 116. For example, the memory controller 118 interfaces with the core 108. For instance, the memory controller 118 receives instructions from the core 108 that involve accessing the memory 116 (e.g., for processing by the core 108). In one or more implementations, the memory controller 118 is communicatively located between the core 108 and the memory system 106, and the memory controller 118 interfaces with the core 108 and the memory system 106.

The device 102 also includes a cleared page tag structure 120 that is incorporated into a level of the cache levels 112. The cleared page tag structure 120 is a type of data cache structure that tracks cache lines that are cleared of data in the cache levels 112. Data cache structures store copies of frequently-accessed data from the memory system 106. Cache lines are individual portions of data mapped in a cache. A cache line is cleared of data if the page is "zeroed out" by system software and includes only zeroes. For example, a computational task originating in the core 108 involves memory allocation and instructs a cache line, including lines or an entire page of a cache level, to be cleared by writing a zero to bytes in the cache lines of the cache line. Subsequent requests originating from the core 108 to fetch data from cleared cache line are wasteful because the cleared cache line does not include data. To prevent these wasteful data fetches, the cleared page tag structure 120 tracks which cache lines in the cache levels 112 are cleared by data commands and stores an indication in the cleared page tag structure 120 that the cache line within the cache levels 112 is cleared of data. Based on the indication that the cache line is cleared of data, data fetch requests are redirected from the cache line, reducing wasteful data fetch traffic to cache lines that do not include data.

In one or more implementations, the cleared page tag structure 120 is an SRAM cache structure that is tagged at a physical page address. In some examples, the cleared page tag structure includes logic to track, detect, record, and/or perform other operations related to storing indications of cleared cache lines, e.g., tags. The logic can be implemented in any of a variety of different manners such as software, hardware, or firmware executing on a programmable processor, and/or any combination of two or more of software, hardware, and firmware. In at least one variation, the cleared page tag structure 120 is implemented as a skew symmetric structure that tracks different contiguous chunks of data cleared, an example of which is Level 2 translation lookaside buffers (L2DTLBs). Because the cleared page tag structure 120 is tagged at a page granularity, each cleared page tag structure 120 entry contains a bit vector of length 64, each bit corresponding to a cache line that the cleared page tag structure uses to record cleared cache lines. A CLZero request for a cache line incurs a cleared page tag structure 120 lookup. Upon a cleared page tag structure 120 miss, a new entry is created with a page tag including all bits initialized to "0." A cleared page tag structure 120 entry bit set to "0" indicates that the cache line is not yet zeroed. Upon cleared page tag structure 120 entry creation, the cache line bit corresponding to the CLZero request is set to an offset bit value of "1." Additionally, if a prior CLZero request resulted in a cleared page tag structure 120 hit, the bit corresponding to the offset bit value of the CLZero cache line is set to "1."

Apart from a CLZero request, load and store requests from the core 108 also trigger a lookup in the cleared page tag structure 120. A bit corresponding to the cache line offset set to "1" indicates that the data fetch request targets a cache line that is zeroed-out. Subsequent data fetch traffic, in response to a request from the core to retrieve data, searches the cleared page tag structure entry and returns an indication including a cache line with zeros to the core 108 without searching the next level in the cache system 110 or to the memory 116. Therefore, a cleared page tag structure 120 hit for a corresponding cache line averts sending data requests down to the cache hierarchy.

Latency benefits vary based on which level of the cache levels 112 employs the cleared page tag structure 120. The cleared page tag structure 120 is optionally implemented at any level of the cache levels 112. For example, FIG. 2 below features the cleared page tag structure 120 implemented at the Level 2 cache 114(2), and FIG. 3 below features the cleared page tag structure 120 implemented at the Level 3 cache 114(3). In other examples, the cleared page tag structure 120 is implemented in the Data Fabric that connects various aspects of the device 102 to a System Probe Filter (SPF).

In this manner, the cleared page tag structure 120 described herein reduces overall data traffic for the cache system 110, improves performance of the processing unit 104 executing the data fetch request, and reduces energy used by conventional techniques that involve directing data fetch traffic to cache lines that do not include data.

Figure 2:
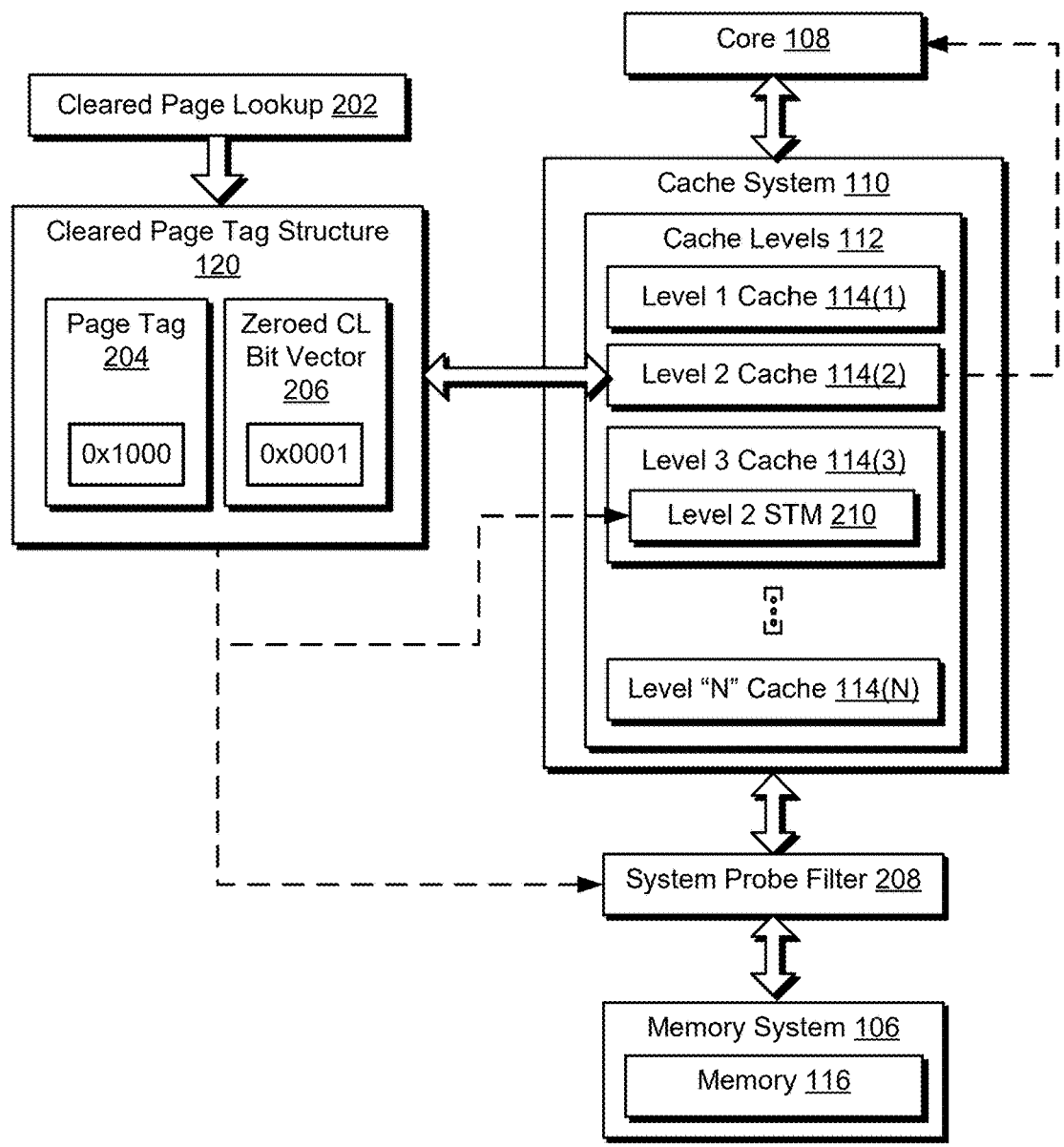
FIG. 2 is a block diagram of a non-limiting example system showing operation of a cleared page tag structure implemented in a Level 2 cache.

FIG. 2 is a block diagram of a non-limiting example 200 system showing operation of a cleared page tag structure implemented in a Level 2 cache. In the illustrated example of FIG. 2, the cache system 110 includes a plurality of cache levels 112, including a Level 1 cache 114(1), a Level 2 cache 114(2), and a Level 3 cache 114(3). The Level 3 cache 114(3) is located lower in the plurality of cache levels 112 than the Level 2 cache 114(2), and the Level 2 cache 114(2) is located lower in the plurality of cache levels 112 than the Level 1 cache 114(1), for instance. In one or more implementations, the core 108 retrieves data from the memory 116 and stores the data in the cache levels 112 of a cache system 110 associated with the core 108. In terms of data communication pathways, the cache levels 112 are closer to the core 108 than the memory 116, and as such, data stored in the cache system 110 is accessible in a shorter amount of time by the core 108 than to access the data stored in the memory 116. In implementations, the one or more cores 108 of the processing unit 104 are configurable to include cache subsystems with differing numbers of caches and different hierarchical structures without departing from the spirit or scope of the described techniques. In some examples, the cache levels 112 are core specific, such that each core has a dedicated Level 1 cache and a dedicated Level 2 cache, while the Level 3 cache 114(3) is shared by multiple cores.

As illustrated in FIG. 2, the cleared page tag structure 120 is implemented in the Level 2 cache 114(2). In this example, the cleared page tag structure 120 detects whether a cache line in the Level 2 cache 114(2) is cleared of data. To do this, the cleared page tag structure 120 tracks commands to clear data in the Level 2 cache 114(2). For example, cache lines are cleared (e.g., "zeroed out") by writing zeroes to all bytes in the cache line by executing one or more operations as part of performing a computational task involving memory allocation.

To track commands that clear data in the Level 2 cache 114(2), the cleared page tag structure 120 monitors physical addresses for data stored in the Level 2 cache 114(2). In various examples, the core 108 retrieves a cache line in response to receiving an instruction to access a particular cache line. As used herein, a "cache line" is a unit of data transfer between the memory 116 and the cache system 110. In one example, the cache line is four bytes and the core 108 retrieves a contiguous four-byte block of data from the memory 116 that includes the data of the particular cache line. Further, the core 108 stores the four-byte block of data as a cache line in the cache system 110. If the core 108 receives a subsequent instruction to access data that is a part of the cache line, the core 108 accesses the data of the cache line from the cache system 110, rather than the memory 116.

For example, commands to access, enter, or clear data of the Level 2 cache 114(2) incur a cleared page lookup 202 using the cleared page tag structure 120. The cleared page tag structure 120 describes which cache lines of the memory 116 are maintained in the cache system 110 and a status of data at those cache lines. A cleared page lookup 202, for instance, is used to determine whether the cache line is cleared of data.

Upon receipt of a command to clear a cache line of the Level 2 cache 114(2), the cleared page tag structure 120 sets a bit value of a page tag in the cleared page tag structure 120 corresponding to the cache line to "1." For instance, the page tag of the cleared page tag structure 120 is a unique identifier of a cache line of a page and contains information mapping the cache line to the memory 116. As illustrated in FIG. 2, the cleared page tag structure 120 assigns a page tag 204 corresponding to "0x1000" (i.e., the physical page with page number 0x1000) the zeroed CL bit vector 206 value of "0x0001" that indicates that one cache line with the physical page number 0x1000 includes only zeroes and is cleared of data. This zeroing-out instruction is also forwarded to the memory 116 so that a memory address corresponding to the cache line is also zeroed out. Although described herein with respect to using certain values (e.g., a bit value of zero indicates that the cache line includes values other than zero while a bit value of one indicates that the cache line includes only zeroes), the described techniques are configurable using opposite values. For instance, in an alternative implementation a cleared page tag structure 120 bit value of one indicates that a corresponding cache line includes values other than zero while a cleared page tag structure 120 bit value of zero indicates that the corresponding cache line includes only zero values.

In examples involving the cleared page tag structure 120 implemented in the Level 2 cache 114(2), a Level 2 Shadow Tag Macro (STM) 212 is implemented in the Level 3 cache 114(3) that tracks residence of cache lines in the Level 2 cache 114(2). For example, data present in the Level 2 cache 114(2) is reflected in the Level 3 cache 114(3) via the Level 2 STM 210. To keep data recorded in the cache levels 112 consistent, the cleared page tag structure 120 also communicates the indication that the cache line of the Level 2 cache 114(2) is cleared of data to the Level 2 STM 210.

When the core 108 issues a subsequent request to read data from the cache line that is cleared of data, the cleared page tag structure 120 intercepts the request and returns an indication that the cache line is cleared of data, without forwarding the request to the memory system 106. For example, the cleared page tag structure 120 returns zeroes to the core 108, indicating the cache line is cleared of data. In this manner, the implementation of the cleared page tag structure 120 avoids excessive bandwidth consumption and energy consumption that would otherwise occur using conventional systems that do not implement the cleared page tag structure 120 and thus produce no indication that a requested cache line has been zeroed out before the data request is forwarded to the memory system 106. After the cleared page tag structure 120 returns an indication that the memory address is cleared of data, the cleared page tag structure 120 sets a bit value in the tag corresponding to the memory address to "0" to enforce coherent access of the data in the memory address for subsequent data requests from the core 108, such as those that share the Level 2 cache 114. In one or more scenarios, the cleared page tag structure 120 enforces coherent access in this way because the clearing instruction request (e.g., CLZero request) invalidates other copies of the data (e.g., all other copies) inside the device 102, e.g., system on chip.

In some examples, the cleared page tag structure 120 implements a replacement policy to update data in the cleared page tag structure 120. For example, an entry in the cleared page tag structure 120 with a maximum number of zeroes is used to replace an entry with fewer zeroes. This replacement policy maximizes coverage of zeroed out entries in the cleared page tag structure 120, increasing potential future hits in the cleared page tag structure 120 during a cleared page lookup 202.

In some examples, the cleared page tag structure 120 also updates a system probe filter 208 with the indication that the cache line includes only zeroes and is cleared of data, such as after the cleared page tag structure 120 intercepts the request and returns the indication that the cache line is cleared of data. This is because the system probe filter 208 serves multiple cores by controlling access to the memory system 106, and the cleared page tag structure 120 informs the system probe filter 208 how different cores interact with memory.

In some examples, the techniques for storing indications of cleared cache lines are optionally applied to clear pages during initialization or resetting data for a next step or iteration. For example, instructions originating in the core 108 request a reset for the cache system 110. In this example, the cleared page tag structure 120 then populates entries for the cleared page lookup 202 indicating that all bytes written for a cache line are zeroes. For instance, because the cache levels 112 are empty after the reset, the cleared page tag structure 120 instead tracks cache lines that are written as zeroes during repopulation of the cache levels 112.

Figure 3:
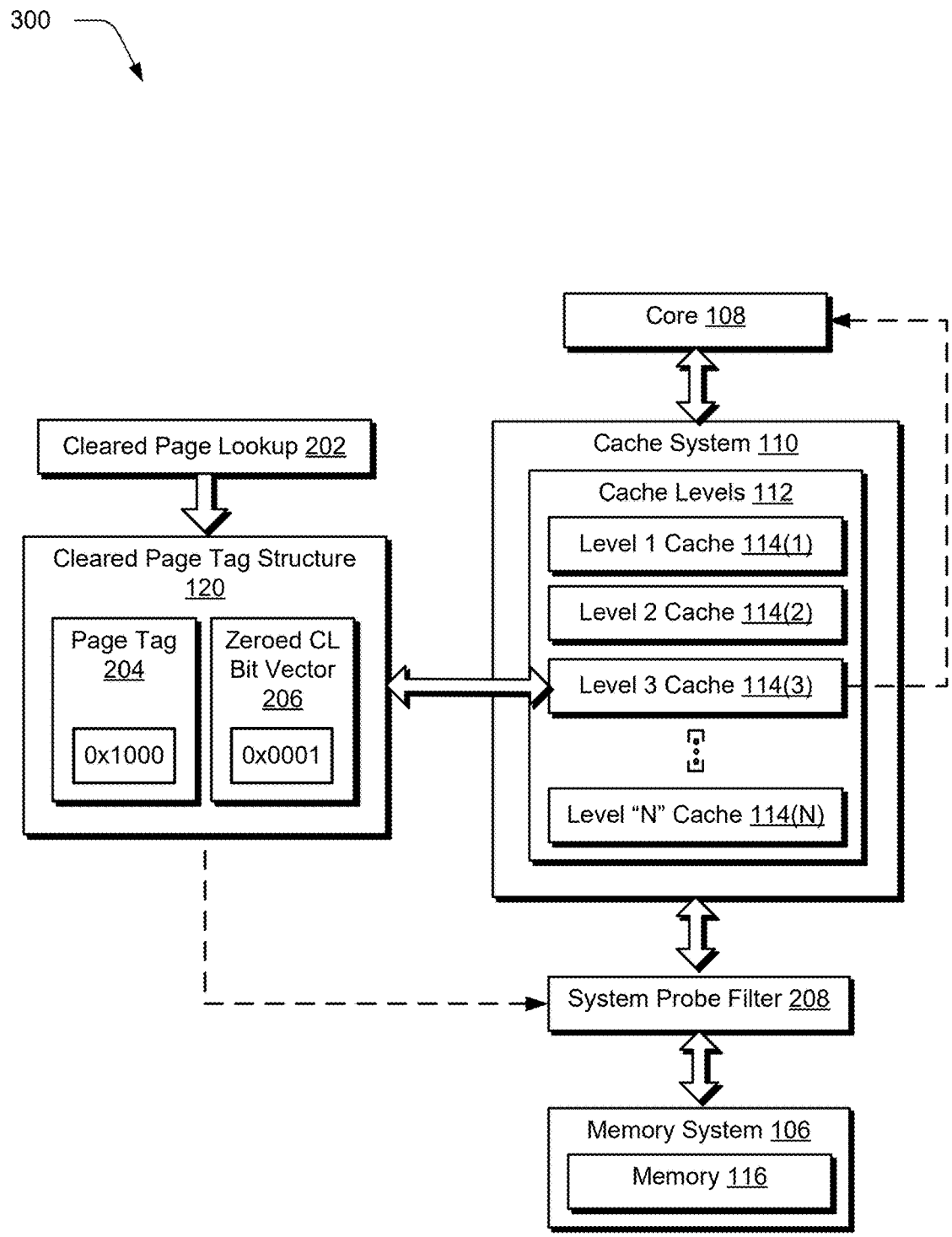
FIG. 3 is a block diagram of a non-limiting example system showing operation of a cleared page tag structure implemented in a Level 3 cache.

FIG. 3 is a block diagram of a non-limiting example 300 system showing operation of a cleared page tag structure implemented in a Level 3 cache. In the illustrated example of FIG. 3, the cache system 110 includes cache levels 112, including the Level 1 cache 114(1), Level 2 cache 114(2), and Level 3 cache 114(3). In this example, the core 108 retrieves data from the memory 116 and stores the data in the Level 3 cache 114(3). In terms of data communication pathways, the cache levels 112 are closer to the core 108 than the memory 116, and as such, data stored in the cache system 110 is accessible in less amount of time by the core 108 than an amount of time taken to access the data stored in the memory 116. Accordingly, data requests for data stored in the Level 3 cache 114(3) take longer to complete than data requests for data stored in the Level 2 cache 114(2).

In implementations, the one or more cores 108 of the processing unit 104 are configurable to include cache subsystems with differing numbers of caches and different hierarchical structures without departing from the spirit or scope of the described techniques. In some examples, the cache levels 112 are core specific, such that each core has a dedicated Level 1 cache and a dedicated Level 2 cache, while the Level 3 cache 114(3) is shared by multiple cores. Accordingly, data stored in the Level 2 cache 114(2) is duplicated in the Level 3 cache 114(3).

As illustrated in FIG. 3, the cleared page tag structure 120 is implemented in the Level 3 cache 114(3). In this example, the cleared page tag structure 120 detects whether a cache line in the Level 3 cache 114(3) is cleared of data. To do this, the cleared page tag structure 120 tracks commands to clear data in the Level 3 cache 114(3). For example, cache lines are cleared (e.g., "zeroed out") by writing zeroes to all bytes in the cache line by executing one or more operation s as part of performing a computational task involving memory allocation.

To track commands that clear data in the Level 3 cache 114(3), the cleared page tag structure 120 monitors physical addresses for data stored in the Level 3 cache 114(3). In various examples, the core 108 retrieves a cache line in response to receiving an instruction to access a particular cache line. As used herein, a "cache line" is a unit of data transfer between the memory 116 and the cache system 110. In one example, the cache line is four bytes and the core 108 retrieves a contiguous four-byte block of data from the memory 116 that includes the data of the particular cache line. Further, the core 108 stores the four-byte block of data as a cache line in the cache system 110. If the core 108 receives a subsequent instruction to access data that is a part of the cache line, the core 108 accesses the data of the cache line from the cache system 110, rather than the memory 116.

For example, commands to access, enter, or clear data of the Level 3 cache 114(3) incur a cleared page lookup 202 using cleared page tag structure 120. The cleared page tag structure 120 describes which cache lines of the memory 116 are maintained in the cache system 110 and a status of data at those cache lines. A cleared page lookup 202, for instance, is used to determine whether the cache line is cleared of data.

Upon receipt of a command to clear a cache line of the Level 3 cache 114(3), the cleared page tag structure 120 sets a bit value of the tag in the cleared page tag structure 120 corresponding to the cache line to "1." As illustrated in FIG. 3, the cleared page tag structure 120 assigns the page tag 204 corresponding to a physical page number "0x1000" the zeroed CL bit vector 206 value of "0x0001" that indicates one of the cache lines includes only zeroes and is cleared of data, e.g., while other cache lines have non-zero data. This zeroing-out instruction is also forwarded to the memory 116 so that a memory address corresponding to the cache line is also zeroed out.

When the core 108 issues a subsequent request to read data from the cache line that is cleared of data, the cleared page tag structure 120 intercepts the request and returns an indication that the cache line is cleared of data, without forwarding the request to the memory system 106. For example, the cleared page tag structure 120 returns zeroes to the core 108, indicating the cache line is cleared of data, such as in scenarios where the Level 3 cache 114(3) does not include the data requested by the core 108. In this manner, the implementation of the cleared page tag structure 120 avoids excessive bandwidth consumption and energy consumption that would otherwise occur using conventional systems that do not implement the cleared page tag structure 120 and thus produce no indication that a requested cache line has been zeroed out before the data request is forwarded to the memory system 106.

In some examples, the cleared page tag structure 120 also updates a system probe filter 208 with the indication that the cache line includes only zeroes and is cleared of data after the cleared page tag structure 120 intercepts the request and returns the indication that the cache line is cleared of data. This is because the system probe filter 208 serves multiple cores by controlling access to the memory system 106, and the cleared page tag structure 120 informs the system probe filter 208 how different cores interact with memory. After the cleared page tag structure 120 returns an indication that the cache line is cleared of data, the cleared page tag structure 120 sets the bit value in the tag corresponding to the cache line to "0" to enforce coherent access of the cache line for subsequent data requests from the core 108 or another core sharing the Level 3 cache 114(3).

Figure 4:
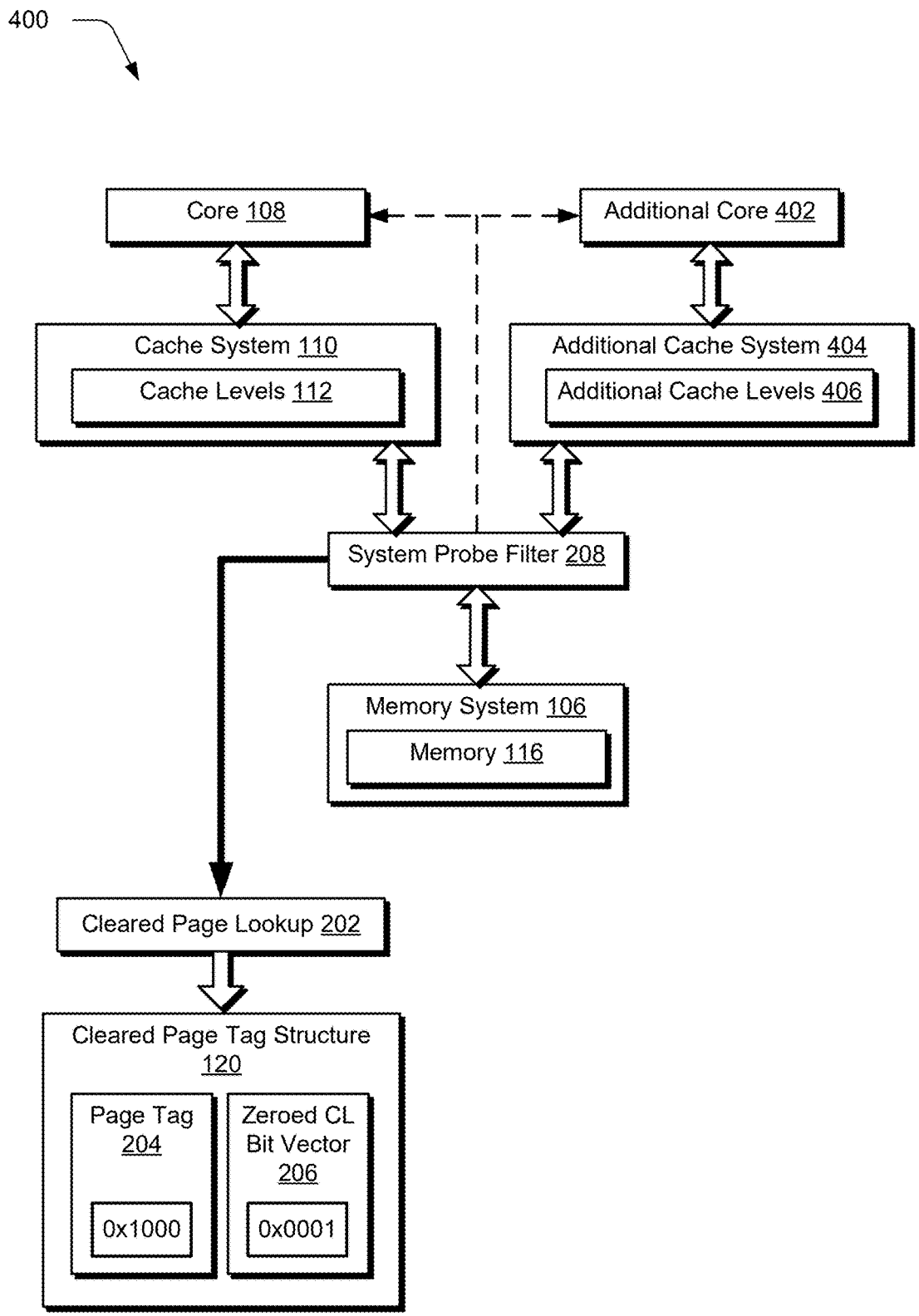
FIG. 4 is a block diagram of a non-limiting example system showing operation of a cleared page tag structure implemented in a system probe filter.

FIG. 4 is a block diagram of a non-limiting example 400 system showing operation of a cleared page tag structure implemented in a system probe filter 208. As discussed above, the system probe filter 208 services multiple cores by controlling access to the memory system 106 and filtering requests entering the memory system 106. In this example, the system probe filter services an additional core 402 and an additional cache system 404 that includes additional cache levels 406, but other examples include additional cores and cache systems. For example, the system probe filter 208 filters out requests from accessing the memory 116 of the memory system 106 if the requested data is found at a different level cache.

In this example, the cleared page tag structure 120 is implemented in the system probe filter 208. The cleared page tag structure 120 encounters the same requests that the system probe filter 208 encounters and tracks zeroed lines from requests to clear memory. The cleared page tag structure 120 is a physically distributed structure in "slices" that match an organization of the system probe filter 208. For example, a slice of the cleared page tag structure 120 tracks cleared lines per partition of a page that maps a slice of system probe filter 208 based on address interleaving.

To track commands that clear the memory 116, the cleared page tag structure 120 monitors memory addresses for commands to clear data. Upon receipt of a command to clear a memory address of data, the cleared page tag structure 120 sets a bit value of a tag in the cleared page tag structure 120 corresponding to the memory address to "1" because CLZero requests invalidate other copies of the data. As illustrated in FIG. 4, the cleared page tag structure 120 assigns the page tag 204 corresponding to physical page number "0x1000" (i.e., the memory address in this example) the zeroed CL bit vector 206 value of "0x0001" that indicates the memory address includes one cache line of only zeroes and additional cache lines of non-zero data. In this example, the cleared page tag structure 120 tracks commands to clear data of memory addresses before the commands reach the memory 116. This zeroing-out instruction is also forwarded to the memory 116 so that the corresponding memory address is also zeroed out to maintain consistency.

When the core 108 issues a subsequent request to read data from a memory address of the memory 116, and if the system probe filter 208 indicates that there is no other copy of the data in the cache system 110 or the additional cache system 404, the cleared page tag structure 120 intercepts the request and returns an indication that the memory address is cleared of data, without forwarding the request to the memory system 106. For example, the cleared page tag structure 120 returns zeroes to the core 108, indicating the memory address is cleared of data. In this manner, the implementation of the cleared page tag structure 120 avoids excessive bandwidth consumption and energy consumption that would otherwise occur using conventional systems that do not implement the cleared page tag structure 120 and thus produce no indication that a requested memory address has been zeroed out before the data request is forwarded to the memory system 106. After the cleared page tag structure 120 returns an indication that the memory address is cleared of data, the cleared page tag structure 120 sets a bit value of the tag corresponding to the memory address to "0" to enforce coherent access of the cache line for subsequent data requests from the core 108 or from the additional core 402.

Figure 5:
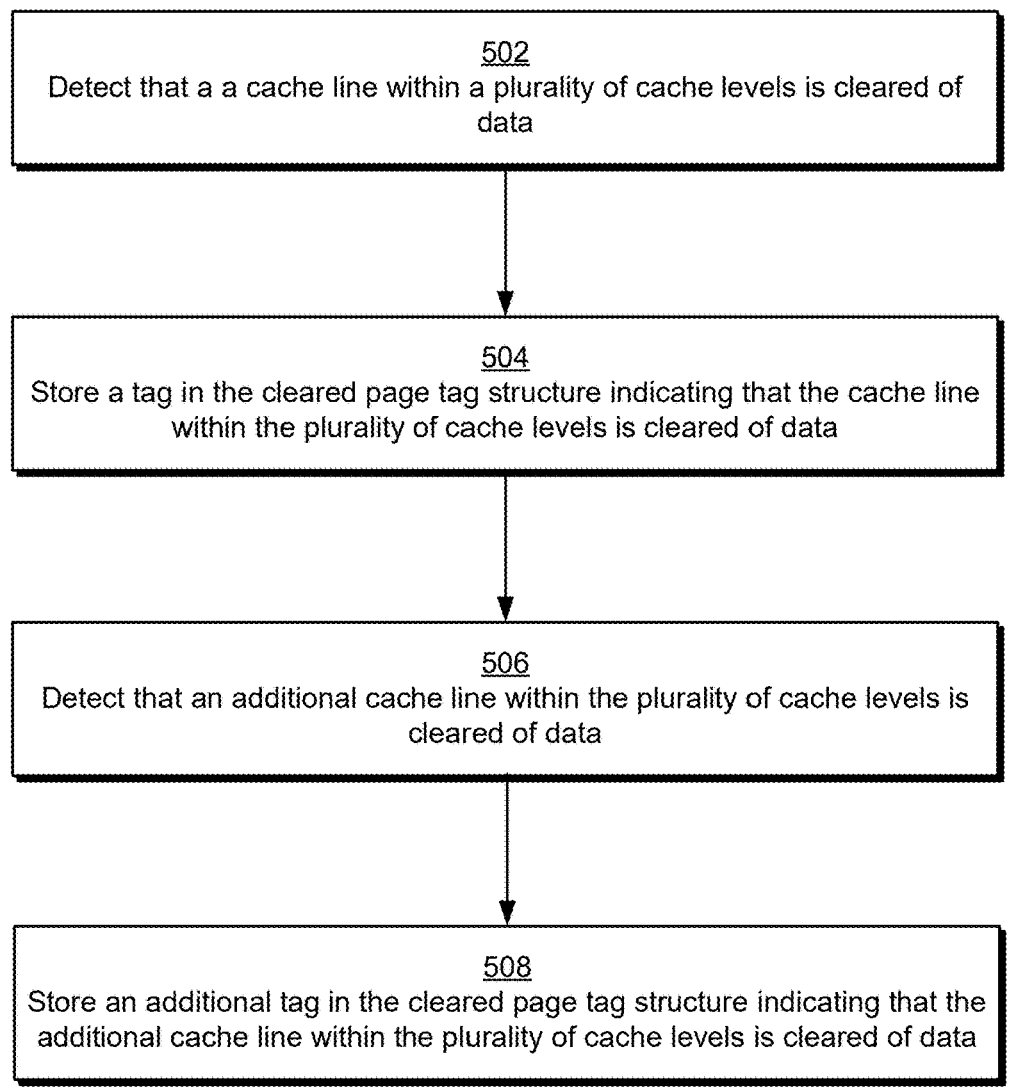
FIG. 5 depicts a procedure in an example implementation of storing indications of cleared cache lines.

FIG. 5 depicts a procedure 500 in an example implementation of storing indications of cleared cache lines.

A cache line within a plurality of cache levels 112 that is cleared of data is detected by a cleared page tag structure 120 (block 502). In some examples, the cleared page tag structure 120 is a static random-access memory (SRAM) cache structure that is coupled to a level of the plurality of cache levels 112. For example, the cleared page tag structure 120 is configured to track requests from a core 108 to clear cache lines.

A tag is stored in the cleared page tag structure 120 indicating that the cache line within the plurality of cache levels 112 is cleared of data (block 504). For example, a cleared page tag structure 120 is located at a particular level of the plurality of cache levels and updates a corresponding cache line of a lower level of the plurality of cache levels with a value of zero in response to detecting that a cache line within the particular level of the plurality of cache levels is cleared of data. In some examples, the particular level of the plurality of cache levels is a Level 2 cache and the lower level of the plurality of cache levels is a Level 3 cache. In some examples, the cleared page tag structure 120 stores a bit value of one in the tag to indicate that the cache line is cleared of data. For example, data fetch traffic returns bit values of zero to a core 108 of a processing unit 104 in response to execution of a request issued by the core 108 to retrieve data from the cache line within the plurality of cache levels 112, such as when the tag in the cleared page tag structure 120 indicates that the cache line within the plurality of cache levels 112 is cleared of data. Additionally or alternatively, the cleared page tag structure 120 reverses a value stored in the tag in response to the request issued by the core to retrieve the data from the cache line. In some examples, the cache line that is cleared of data includes only values of zero.

An additional cache line within a plurality of cache levels 112 that is cleared of data is detected (block 506).

An additional tag is stored in the cleared page tag structure 120 concurrently with the tag, the additional tag indicating that the additional cache line within the plurality of cache levels 112 is cleared of data (block 508). In some examples, the cleared page tag structure 120 updates the tag based on modification of data within the plurality of cache levels 112.

Figure 6:
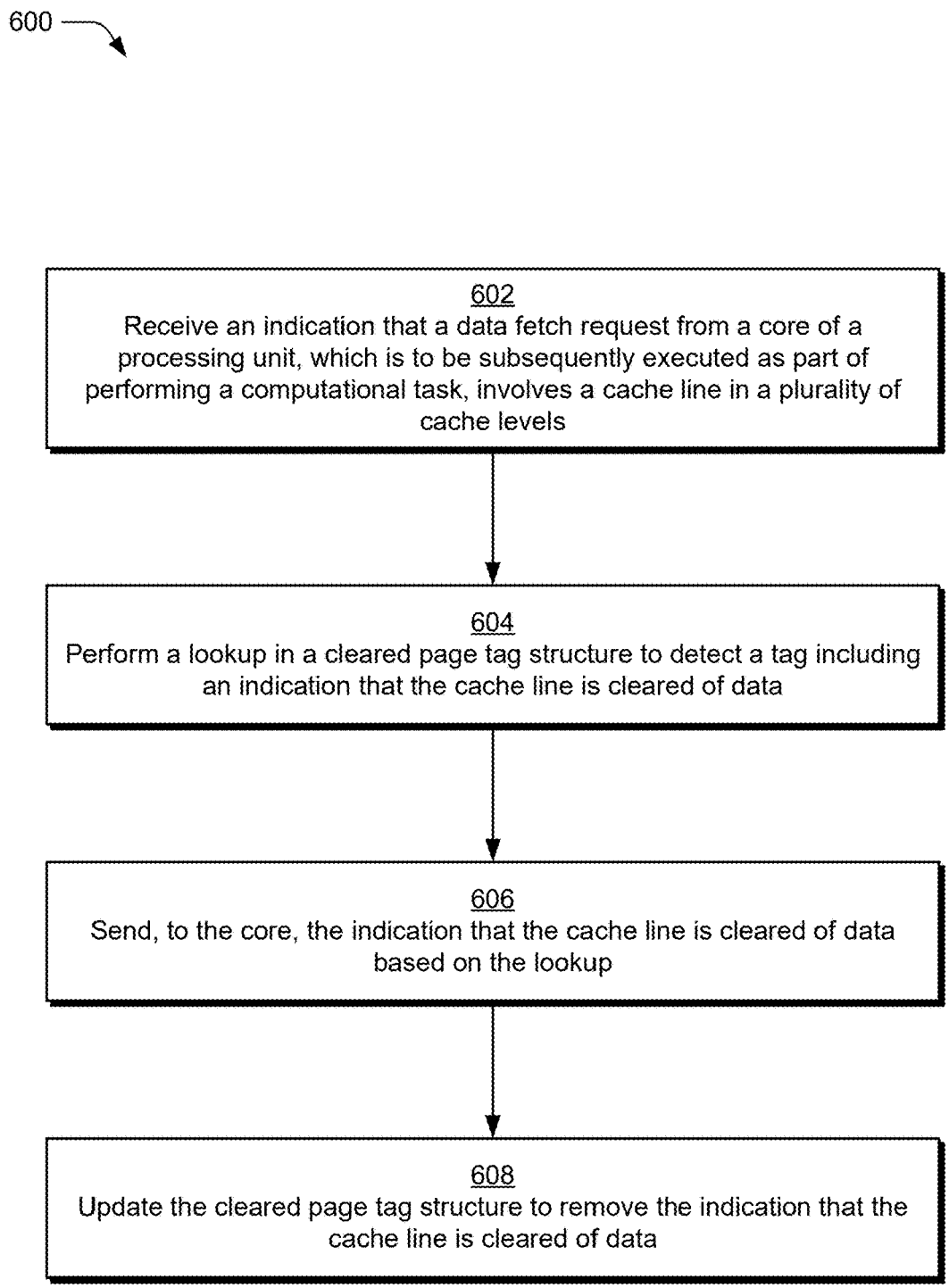
FIG. 6 depicts a procedure in an additional example implementation of storing indications of cleared cache lines.

FIG. 6 depicts a procedure 600 in an additional example implementation of storing indications of cleared cache lines.

An indication is received by a cleared page tag structure (block 602). In accordance with the principles discussed herein, the indication indicates that a data fetch request from a core 108 of a processing unit 104, which is to be subsequently executed as part of performing a computational task, involves a cache line in a plurality of cache levels 112. In one or more implementations, the cleared page tag structure 120 is a static random-access memory (SRAM) cache structure that is coupled to a level of the plurality of cache levels 112.

A cleared page lookup 202 is performed in the cleared page tag structure 120 to detect a tag including an indication that the cache line is cleared of data (block 604). In some examples, the cleared page tag structure 120 is configured to track requests from cores that request to clear cache lines.

The indication that the cache line is cleared of data is sent to the core 108 based on the lookup (block 606). In one or more implementations, the cleared page tag structure 120 is located at a particular level of the plurality of cache levels. In response to detecting that a cache line within a particular level of the plurality of cache levels is cleared of data, the cleared page tag structure 120 is configured to update a corresponding cache line within a lower level of the plurality of cache levels with a value of zero. For example, the particular level of the plurality of cache levels is a Level 2 cache and the lower level of the plurality of cache levels is a Level 3 cache. Additionally or alternatively, the cleared page tag structure 120 is located at a system probe filter 208 coupled to the plurality of cache levels 112. In some examples, the cleared page tag structure 120 stores a bit value of one in a tag in the cleared page tag structure 120 to indicate that the cache line is cleared of data.

The cleared page tag structure 120 is updated to remove the indication that the cache line is cleared of data (block 608). For example, the cleared page tag structure 120 is reset, such as by reversing or flipping an asserted bit value (e.g., of '1') in the tag which indicates that the cache line is cleared of data to a deasserted bit value (e.g., of '0') which indicates that the cache line is not cleared of data. This reversal of the indication is performed in one or more scenarios to maintain coherent access of the data in the cache line for subsequent data fetch requests from the core 108.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102 having the core 108 and the memory system 106 having the memory 116) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A cache system comprising:
   a plurality of cache levels; and
   a cleared page tag structure coupled to a level of the plurality of cache levels to:
      detect that a cache line within the plurality of cache levels is cleared of data;
      store a tag, in the level that includes the cache line, indicating that the cache line is cleared of data; and
      update a different cache line of a different level of the plurality of cache levels to indicate that the cache line is cleared of data.

2. The cache system of claim 1, wherein the cleared page tag structure is further configured to:
   detect that an additional cache line within the plurality of cache levels is cleared of data; and
   store an additional tag concurrently with the tag, the additional tag indicating that the additional cache line within the plurality of cache levels is cleared of data.

3. The cache system of claim 1, wherein the level of the plurality of cache levels is a Level 2 cache and the different level of the plurality of cache levels is a Level 3 cache.

4. The cache system of claim 1, wherein the cleared page tag structure is a static random-access memory (SRAM) cache structure that is coupled to a level of the plurality of cache levels.

5. The cache system of claim 1, wherein the cleared page tag structure is configured to track requests from a core to clear cache lines.

6. The cache system of claim 1, wherein the cleared page tag structure stores a bit value of one in the tag to indicate that the cache line is cleared of data.

7. The cache system of claim 6, wherein data fetch traffic returns bit values of zero to a core of a processing unit in response to a request issued by the core to retrieve data from the cache line based on the tag indicating that the cache line is cleared of data.

8. The cache system of claim 7, wherein the cleared page tag structure reverses a value stored in the tag in response to the request issued by the core to retrieve the data from the cache line.

9. The cache system of claim 1, wherein the cache line that is cleared of data includes only values of zero.

10. The cache system of claim 1, wherein the cleared page tag structure updates the tag based on modification of data within the plurality of cache levels.

11. The cache system of claim 1, wherein the cleared page tag structure is configured to update a corresponding cache line of a lower level of the plurality of cache levels with a value of zero in response to detecting that the cache line within the level of the plurality of cache levels is cleared of data.

12. The cache system of claim 1, wherein the level of the plurality of cache levels is a lower level of the plurality of cache levels than the different level of the plurality of cache levels.

13. A device comprising:
  a cleared page tag structure implemented in circuitry of the device and configured to:
    receive an indication that a data fetch request from a core of a processing unit to be subsequently executed as part of performing a computational task involves a cache line in a plurality of cache levels;
    send, to the core, an indication that the cache line is cleared of data based on a lookup for a tag of the cleared page tag structure in a level of the plurality of cache levels that includes the cache line; and
    update a different cache line of a different level of the plurality of cache levels to indicate that the cache line is cleared of data.

14. The device of claim 13, wherein the cleared page tag structure is configured to track requests from cores to clear cache lines.

15. The device of claim 13, wherein the level of the plurality of cache levels is a Level 2 cache and the lower different level of the plurality of cache levels is a Level 3 cache.

16. The device of claim 13, wherein the cleared page tag structure is located at a system probe filter coupled to the plurality of cache levels.

17. The device of claim 13, wherein the cleared page tag structure is a static random-access memory (SRAM) cache structure that is coupled to a level of the plurality of cache levels.

18. The device of claim 13, wherein the cleared page tag structure stores a bit value of one in a tag to indicate that the cache line is cleared of data.

19. A method comprising:
  detecting that a cache line within a plurality of cache levels is cleared of data based on a computational task performed as part of a plurality of commands executed by a core of a processing unit;
  storing a tag in a cleared page tag structure, in a level of the plurality of cache levels that includes the cache line, indicating that the cache line is cleared of data; and
  updating a different cache line of a different level of the plurality of cache levels to indicate that the cache line is cleared of data.

20. The method of claim 19, further comprising:
  detecting that an additional cache line within the plurality of cache levels is cleared of data; and
  storing an additional tag in the cleared page tag structure concurrently with the tag, the additional tag indicating that the additional cache line within the plurality of cache levels is cleared of data.

* * * * *